United States Patent [19]

Alagy et al.

[11] Patent Number: 5,037,619
[45] Date of Patent: Aug. 6, 1991

[54] OXIDIZATION OF AN OXIDIZABLE CHARGE IN THE GASEOUS PHASE AND A REACTOR FOR IMPLEMENTING THIS METHOD

[75] Inventors: Jacques Alagy, Chemin Beckensteiner; Christian Busson, Chemin de Cogny, both of France

[73] Assignee: Institut Francais du Petrole, Rueil Malmaison, France

[21] Appl. No.: 507,507

[22] Filed: Apr. 11, 1990

Related U.S. Application Data

[63] Continuation of Ser. No. 149,523, Jan. 28, 1988, abandoned, which is a continuation of Ser. No. 947,748, Dec. 30, 1986, abandoned.

[30] Foreign Application Priority Data

Dec. 30, 1985 [FR] France .................. 85/19431

[51] Int. Cl.$^5$ .................. B01T 8/04; B01T 8/06
[52] U.S. Cl. .................. 422/191; 366/340; 422/195; 422/196; 422/222
[58] Field of Search .............. 422/148, 176, 191, 194, 422/195, 172, 220, 222, 224, 196; 366/336, 337, 340

[56] References Cited

U.S. PATENT DOCUMENTS 3,706,534  12/1972  Verheul et al. .................. 260/687
4,222,671  9/1980  Gilmore .................. 366/337
4,340,501  7/1982  Davidson .................. 422/222
4,378,336  3/1983  Yoon .................. 422/220
4,614,440  9/1986  King .................. 366/336

Primary Examiner—Jill Johnston
Attorney, Agent, or Firm—Antonelli, Terry, Stout & Kraus

[57] ABSTRACT

An oxidizable charge is oxidized in a gaseous phase reaction. The oxidizable charge and an oxidizing gas flow simultaneously and separately through a distribution zone made of a ceramic material. In at least a part of the distribution zone, the oxidizable charge and the oxidizing gas flow through a multiplicity of passages of a dimension so small that any flame resulting from oxidation of the oxidizable charge will be quenched. The oxidizable charge and oxidizing gas are then mixed in a mixing zone made from a ceramic material defining a multiplicity of spaces with passages having a dimension comparable to the dimension of the passages in the distribution zone. The mixture of gases then flows through a reaction zone made from a ceramic material defining another multiplicity of passages having dimensions comparable to those in the distribution zone. The distance between each of the distribution, mixing and reaction zones is also so small that any flame resulting from oxidation of the oxidizable charge will be quenched.

17 Claims, 3 Drawing Sheets

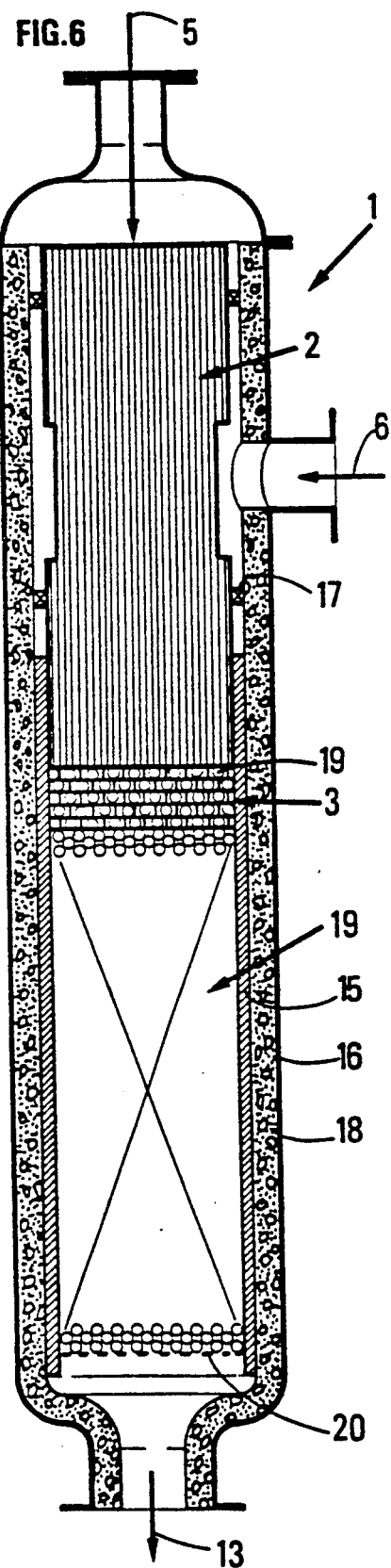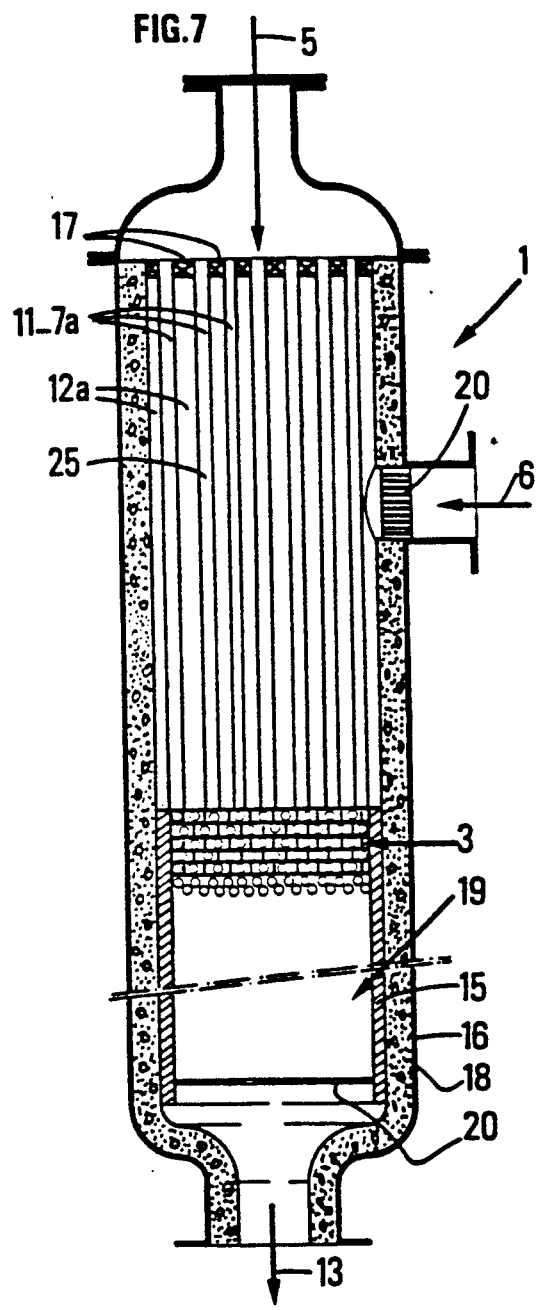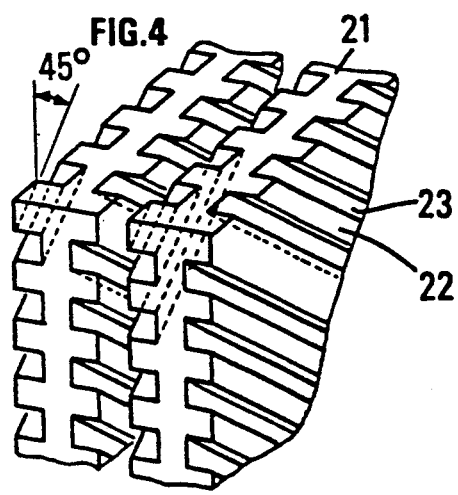

OXIDIZATION OF AN OXIDIZABLE CHARGE IN THE GASEOUS PHASE AND A REACTOR FOR IMPLEMENTING THIS METHOD

This is a continuation of application Ser. No. 149,523, filed on Jan. 28, 1988, now abandoned, which is a continuation of application, Ser. No. 947,748, filed on Dec. 30, 1986, now abandoned.

BACKGROUND OF THE INVENTION

1. Field of the Invention

The present invention relates to a new method for the oxidization of an oxidizable charge in the gaseous phase by a gas mixture containing at least one oxidizing gas, as well as a reactor for putting this method into practice.

It applies more especially to the slow and partial oxidization of oxidizable charges such as for example hydrocarbons for the preparation of synthetic gases comprising essentially carbon monoxide and hydrogen for the synthesis, for example, of methanol and higher homologous alcohol. It may be applied also, for example, to the oxidization of the vapor reforming effluents, of benzene, or to ammonoxidization reactions.

Although the oxidizing gases may include more than oxygen, ozone or the halogens, only the reactions with oxygen will be considered by way of example.

2. Description of the Prior Art

It is known to provide partial oxidization of methane, as indicated for example in U.S. Pat. No. 2,621,117.

The reaction takes place in a flame where the mixture of the gases is never perfect. Under these conditions, high temperatures are rapidly reached in the oxygen rich zones.

The gases produced at high temperature are then mixed in a zone rich in the charge to be oxidized and cause cracking of the molecules with formation of carbon likely for example to foul up the catalysts in the rest of the process and to reduce the efficiency of the reaction.

In the case of methane, production of carbon is observed and the synthetic gases must subsequently have the dust removed therefrom before use, for example for the synthesis of methanol from carbon oxides and hydrogen.

Besides the formation of carbon black, excessive overheating may occur of the zone where contact of the reactive gases takes place and in many cases these undesirable effects may be essentially attributed to the device for mixing the reactive gases at the inlet to the reactor, mixing of the gases being made at too slow a speed with respect to the gas phase reaction speed.

This is the case when the oxygen is injected through a single channel which must, moreover, have a sufficient section for admitting the whole of the flow and, although the gas is injected at high speed through this section, the speed of dispersion of the oxygen molecules is slow, compared to that of the reaction.

In addition, the oxygen jet, at the position where it leaves its orifice, is generally in the environment of the gas to be oxidized which flows at slow speed in the reactor,. This is not favorable to the rapid dispersion of the oxygen molecules.

The European patent EP 001 946 describes a reactor in which the oxygen, because of its high flow rate, is injected into the process gas through a multitude of parallel channels, each of these channels ending in an outlet orifice one at least of the dimensions of which is very much reduced, such as a slit whose width is preferably less than 8 mm.

In addition, in order to increase the dispersion speed of the oxygen in the process gas, this latter is driven with a violent helical movement around said channels, obtained by tangential injection of this gas on the inner walls of the apparatus.

Additionally U.S. Pat. Nos. 4,381,187 and 3,741,533 illustrate technological background of the invention.

Moreover, it is well known, particularly from the book by G. de Soete and A. Feugier: "Aspects physiques et chimiques de la combustion" Editions Technip, pages 87 to 93, to use the wall effect for reducing reaction speed and avoiding propagation of flame.

In the present case, the presence of pure oxygen and the high temperature implying a high thermal flow require flame arresting devices allowing the reaction to continue without explosion, while being within explosive limits (particularly in the case of the partial oxidization of methane).

The objectives which it is proposed to obtain and which correspond to the problems raised by the prior art are essentially the following:

- an oxygen and charge distribution zone of a reactor adapted to a substantially homogeneous perfectly controlled mixture between the oxygen and the charge to be oxidized. This distribution zone must be particularly adapted to the rapid dispersion of the oxygen molecules.
- "flame arrest or quenching", avoiding explosion and yet allowing the operation to be carried out at temperatures which may reach more than 1000° C., with the object of protecting the reactor and a mixing device from the excessive heat released during partial oxidization.

SUMMARY OF THE INVENTION

The present invention provides a new method overcoming the drawbacks of the prior art. It relates more precisely to a method for oxidizing an oxidizable charge in the gaseous phase by a gas mixture containing at least one oxidizing gas, in which the following successive steps are carried out:

a) the oxidizable charge and the oxidizing gas are caused to flow simultaneously in a distribution zone made from a ceramic material comprising at least one row of channels of a first type or group so that one of the two gases formed respectively by the oxidizable charge and the oxidizing gas flows separately inside said row and so that the other gas flows separately outside said row, the oxidizable charge and the oxidizing gases flowing through at least a part of said zone and advantageously in the vicinity of the outlet, a multiplicity of spaces with passages having, at least in one direction, a dimension at most equal to 10 mm corresponding to the quenching distance of the flame which may result from the oxidization of said charge by said oxidizing gas, b) then said oxidizable charge and said oxidizing gas are mixed, thus distributed in the mixing zone made of a ceramic material defining a multiplicity of spaces having passages with, at least in one direction, a dimension comparable to that of the passages of step a), and c) the mixture of products from step b) is caused to react in a ceramic material reaction zone having a multiplicity of spaces, with passages having, at least in one direction, a dimension comparable to that of the passages defined in steps a) and b), the distance between the distribution zone and the mixing zone on the one hand and the mixing zone and the reaction zone, on the other, being at most equal to said quenching distance of the flame.

The channels of said row may be juxtaposed. The outside of each row may comprise in a first embodiment, a first ceramic packing which may comprise either at least one row of channels of a second type or particular elements.

In these two embodiments, one of the two gases (for example the oxidizable charge) flows through the channels of the first type or group whereas the other gas (for example the oxidizing gas) flows through the packing.

The facing surfaces of the mixing zone and of the distribution zone, on the one hand, and the facing surfaces of the mixing zone and the reaction zone, on the other, are advantageously dimensioned so that the surface of the mixing zone is at least equal to that of the distribution zone and at most equal to that of the reaction zone.

Advantangeously, the dimension of said passages, corresponding to the flame quenching distance will at most be equal to 5 mm and preferably between about 0.1 to 2 mm.

The distribution zone, the mixing zone and the reaction zone are advantageously made from a refractory ceramic material, which may be chosen from the group comprising mullite, cordierite, the silicon nitrides such as $Si_3N_4$, the alkaline-earth oxides, the transition metal oxides and silicon carbide.

The present method leads to improved yields, for example of synthetic gas, with respect to existing methods.

The invention also relates to a reactor for oxidizing an oxidizable charge in the gaseous phase by a gas mixture containing at least one oxidizing gas. The reactor includes oxidizable charge and oxidizing gas feed means and means for discharging the reaction products.

It further comprises in combination, over a part at least of its section, ceramic material distribution means having at least one row of at least one channel of a first type or group connected to the feed means for one of the two gases (oxidizable charge or oxidizing gas) and inside which said gas flows, said distribution means having on the outside of said channel a first packing connected to the feed means of the other gas, the inside of said channel being further filled with a second packing, said packings being adapted to define in at least a part of the distribution means a multiplicity of spaces having passages with, in one direction at least, a dimension at most equal to 10 mm, said row and said first packing being adapted particularly for distributing separate layers of the oxidizable charge and the oxidizing gas in a mixing means made from a ceramic material through their end the closest to said mixing member, said mixing means being adapted for mixing said charge and said oxidizing gas and for defining all along said mixing means a multiplicity of spaces having passages with, in one direction at least, a dimension at most equal to 10 mm, said mixing means being situated at a distance at most equal to 10 mm, on the one hand, from the end of said row of the channel and of said first packing and, on the other hand, from a reaction means made from a ceramic material having said second ceramic material packing adapted for defining in at least a part of said reaction means and advantageously all along these means, a multiplicity of spaces having passages with, in at least one direction, a dimension at most equal to 10 mm through which the reaction products are channelled towards the discharge means.

By the expression "in at least a part" of the distribution or reaction means is meant at least in the immediate vicinity of the mixing means, on the same side as the distribution means and on the same side as the reaction means.

In a first embodiment of the mixing means this latter has a plurality of stages with a mesh substantially offset with respect to each other and filled with said second ceramic material packing.

In a second embodiment, the mixing means includes a plurality of plates, preferably substantially vertical, having on each side of each of them a plurality of projections and ducts slanted oppositely on each side of each plate, said plates being disposed so that the projections and ducts are crossed.

For the sake of understanding, a reactor will be described by way of example in the description in which the distribution means comprise advantageously a monolith with multiple juxtaposed channels having at least one row of at least one channel of a first type or group connected to the oxidizable charge feed means, this row alternating with a row of at least one channel of a second type connected to the oxidizing gas feed means, each of these channels being filled with a packing adapted to define said multiplicity of spaces.

Preferably, the first row and the last row will be reserved for the oxidizable charge.

Advantageously, the above dimensions and the distance from the mixing means to the end or outlet of the distribution means and the distance from the mixing means to the inlet of the reaction means or reaction zone are at most equal to 5 mm and preferably between 0.1 and 2 mm.

In one embodiment, the spaces are defined by ceramic packings which may comprise at least one monolith including a plurality of juxtaposed channels, advantageously substantially parallel, each of the channels having a section between 0.0025 and 100 mm².

Preferably, the channels relative to the distribution monolith or those relative to the monolith of the reaction zone have a section between 0.01 and 25 mm². This section has any shape but is preferably polygonal and, particularly preferably, square or rectangular.

When the mixing means includes a plurality of stages with staggered mesh, the channels of the monolith disposed in the meshes of the mixing means have a section preferably between 0.01 and 25 mm². Similarly, the section of the ducts of the mixing means, in the case of the plates disposed substantially in the flow direction of the gases, measured once the plates are juxtaposed is compatible with the flame quenching distance and so between 0.0025 and 100 mm² and preferably between 0.01 and 25 mm².

This duct section may have any shape, for example polygonal and is preferably square or rectangular.

The ducts are generally slanted in a variable manner and the degree of slant may vary from a few degrees with respect to the vertical to a few degrees with respect to the horizontal. It is preferably between 30° and 50°.

The plates are generally of a small thickness for improving the mixture. They are generally juxtaposed, but they may possibly have a spacing such that, at the level of the inside of the crossed channels, it remains compatible with the quenching distance.

The spaces may also be defined, in another embodiment by packings comprising particular elements such for example as ceramic balls and sticks.

In a particularly advantageous embodiment, the monolith may be not empty, but at leat one of them may include at least one filling of elements such for example as ceramic balls and rods, of a size substantially less than that of a unitary channel, these materials being retained at the level of the different zones by ceramic material grids.

Generally, the charge and the oxidizing gas flow through the packings and/or the filling in the direction of the mixing zone.

The three zones forming the reactor of the invention and particularly the distribution zone with at least one row of at least one channel may be filled with the particular elements described above but it is possible to fill only at least one of the three zones, wholly or partially, if furthermore, the size of each unitary channel in a given zone is compatible with the flame quenching distance.

It is also possible for example to fill with balls only the monolith of the reaction zone or else this latter and the monolith of the distribution zone.

The size of these particles is generally between 0.01 and 10 mm.

The packings may also be, in yet another embodiment, a catalyst alone or combined with the above filling. The catalyst may for example be copper chloride and potassium chloride deposited on alumina, venadium oxide deposited on alumina or with addition of potassium sulphate deposited on silica, cerium or lanthanum deposited on silica, bismuth phosphomolybdate or cobalt molybdate deposited on silica, metal oxides (Ag and Cu for example) and porous silicon carbide coated with silver.

The above packings and filling reduce the flame quenching dimensions to a value which is difficult to attain by the present technology, without the risk of defects and consequently to conduct oxidization reactions in the presence of pure oxygen.

In the distribution zone, the rows of channels of the first type of order for example $n-2, n, n+1, n+3, n+5$ have the oxidizing gas flowing therethrough, n being any integer.

Rows of channels ... $n-2, n-1, n+2, n+3, n+6, n+7$ ... may be made available for the charge and rows ... $n, n+1, n+4, n+5, n+8, n+9$ ... for the oxiding gas.

It little matters which fluid is chosen for the first row, it is generally advantageous with respect to the alternation and preferably for a row of channels reserved for the oxidizing gas to be included between the rows reserved for the charge when it is a question for example of a monolith in the distribution zone. This has the advantage of causing all the oxidizing gas to be consumed.

The multichannel distribution zone has the advantage of causing the oxidizable charge and the oxidizing gas to flow in the form of uniform layers and of avoiding flashback since the oxidization reaction is initiated as soon as mixing of the fluids is begun, which fluids are introduced hot in the reactor.

The mixing means is advantageously disposed in a plane substantially perpendicular to the flow of the gases, but it may be oriented differently.

A high number N of mixing stages due to the presence, for example, of N disks of small thickness, with offset or offcentered mesh and with any polygonal section, but advantageously square or rectangular divides the flow. The mixing zone consequently allows a substantially perfectly controlled homogeneous micromixing to be obtained in which the oxygen for example is rapidly dispersed and an oxidization reaction with arrest of the propagation flame, which avoids any risk of explosion.

Finally, the reaction zone properly speaking allows the oxidization reaction to advance, to be controlled taking into account the heat levels reached and the reaction products to be discharged.

Because of the small section of the channels, and because of the mesh of the different stages or ducts of the mixing means and also because of the distance between the different combined means of the reactor, a new oxidization method and reactor are formed without there being backmixing, or explosions (or flashback).

The whole of the device made from a refractory (ceramic) material, so easy to implement, is neutral with respect to the charge, to the oxidizing gas and to the reaction product; it may operate at wall temperatures reaching 1200° to 1500° C.

The channels of the monoliths have a unitary cross-section between 0.0025 and 100 mm$^2$ and preferably substantially equal. Very advantageously, they may occupy the whole area of the reactor and be for example in the form of a cylinder when the reactor is tubular, but the monolith could also have a square, rectangular or any other shaped section.

For example, the length of each unitary channel is from 10 mm to 3000 mm.

The number of stages of disks, for example, splitting up the gas layers of oxidizable charge and oxidizing gas may be between 6 and 50 preferably between 20 and 40. The unitary thickness varies from 1 to 10 mm and is preferably equal to 5 mm.

Particularly interesting results have been obtained, without deposition of coke for example and with a maximum yield when the surface situated opposite the mixing zone and the distribution zone and the surfaces opposite the mixing zone and the reaction zone are substantially equal.

The arrival of the oxidizable charge in the rows of the first type of channel intended to be distributed in the distribution zone takes place substantially perpendicularly to the axis of these rows, at an intermediate point situated at a distance from the mixing zone between 40 and 95% of the total length of the distribution zone; on the other hand, the arrival of the oxidizing gas in the rows of the second type of channel (first packing) intended to be distributed in the distribution zone may take place along the axis of said channels.

It is further possible to invert the gaseous fluid intakes, for example the oxidizable charge may be introduced along the axis of the channels, whereas the oxidizing gas may be fed substantially perpendicularly as in the above described case.

For the section of the channels one at least of the following forms may be chosen: square, rectangular, cylindrical, elliptic, circular or triangular.

The oxidizable charge and the oxidizing gas flows substantially in the same direction towards a mixing zone, for example from bottom to top or top to bottom in the case of a vertical reactor of tubular shape.

The oxidizable charge usable in the invention includes, for example, saturated aliphatic hydrocarbons such as methane and the effluents of the vapor reforming process, orthoxylene, naphtalene, benzene, methanol the methane-toluene mixture and the ethylene-hydrochloric acid mixture.

BRIEF DESCRIPTION OF THE DRAWINGS

The invention will be better understood from the description of some embodiments, given by way of illustration, but in no wise limitative, with reference to the accompanying Figures:

FIG. 4 illustrates a plate mixing means FIGS. 6 and 7 show two other embodiments of the invention.

DESCRIPTION OF THE PREFERRED EMBODIMENTS

Figure 1:
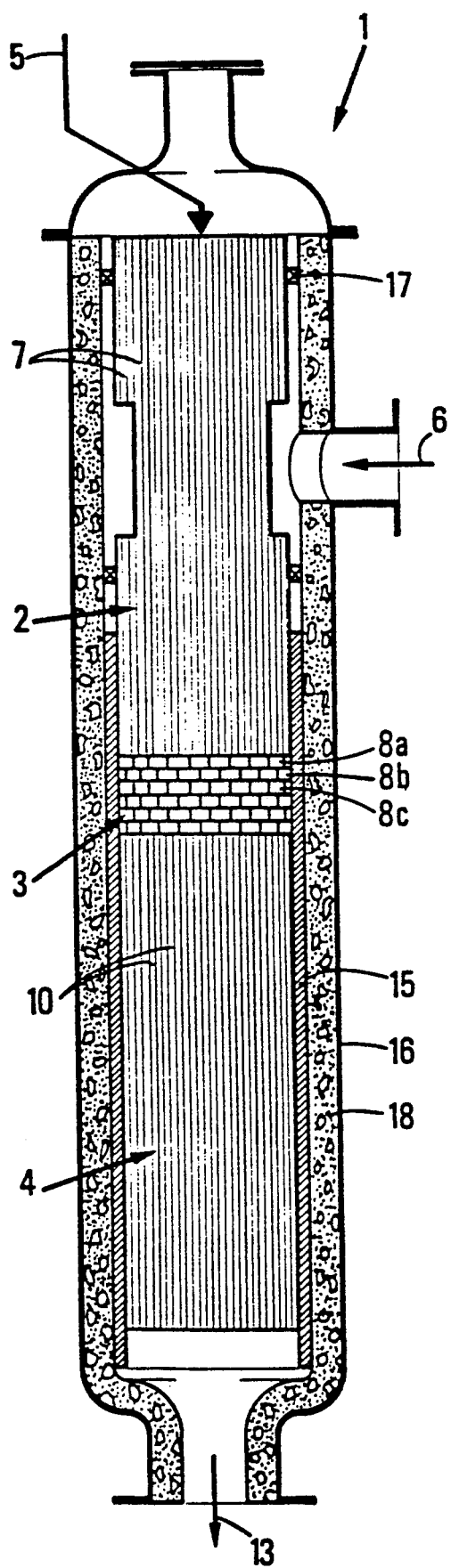
FIG. 1 shows schematically one embodiment of the method of the invention in longitudinal section.

In FIG. 1 one embodiment has been shown, wherein, a vertical cylindrical oxidization reactor 1 of elongate form comprising a packing having a first monolith 2 of cylindrical shape but whose section is for example square in which are formed channels 7 made of silicon carbide which are substantially parallel to each other and to the axis of the reactor, and a mixer 3, made for example from mullite, formed by a plurality of disks 8a, 8b, 8c . . . of cylindrical form, of small thickness and with staggered mesh like openings 9.

Figure 5:
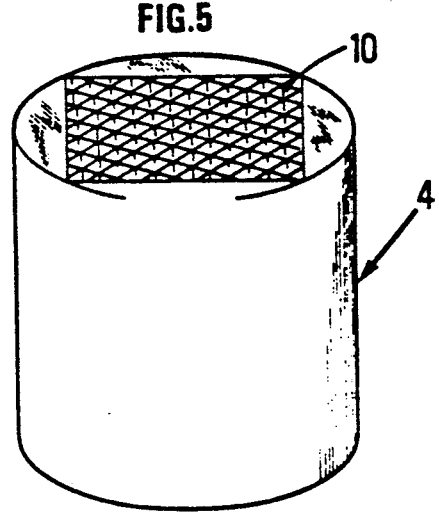
FIG. 5 shows a schematical view of the second monolith of the reaction zone.

Under this mixer is provided a second monolith 4, cylindrical in shape but with a used section similar to that of the monolith 2, representing the mullite reaction zone (FIG. 5) and including a plurality of juxtaposed channels 10, substantially parallel to each other and to the axis of the reactor. The individual cross-section of each channel 10, has a square shape for example is about 1 mm² and the length of each channel is for example about 50 cm.

The channels 10 are, on the one hand, intended to channel reaction products to a discharge line 13 and, on the other, because of their small width and by the wall effect acts to "quench the flame", which allows the reaction to continue without explosion.

Figure 2A:
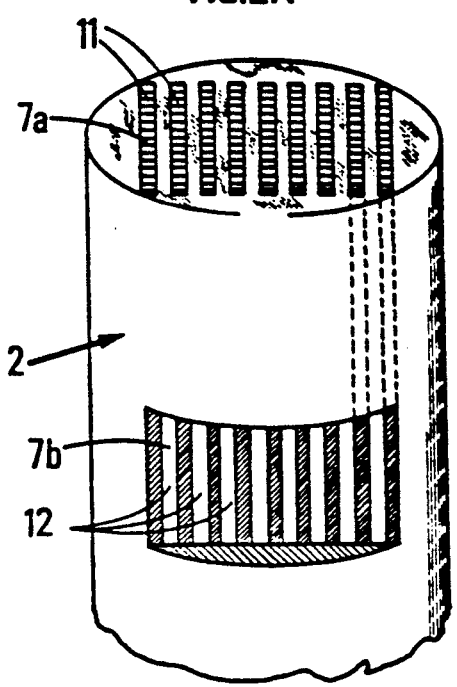
FIGS. 2A and 2B illustrate different embodiments of the distribution zone for the oxidizable charge and the oxidizing gas.

In this embodiment, the oxidizable charge, previously heated to about 400° C. for example, arrives through a pipe 5 and feeds from top to bottom a plurality of rows 11 of a first type of channel 7a (FIG. 2A).

The charge is thus distributed in the form of uniform layers substantially parallel to each other and to the axis of the reactor 1.

The oxidizing gas preheated for example to about 150° C. is also distributed in the form of uniform layers substantially parallel to each other and to the axis of the reactor 1 and flows from top to bottom in rows 12 of channels 7b of the second type which are disposed alternately with the rows 11 of channels 7a.

The upper end of the channels 7b has been closed with a ceramic material paste. The gas supply for these rows 12 is provided for example in a direction substantially perpendicular to the axis of these channels 7b, through a supply line 6, and at an intermediate point on at least one generatrix of the reactor situated at a distance from the mixing zone 3 between 40 and 95% of the total length of the first monolith 2.

To obtain the rows 12 (FIG. 2A), the monolith 2 is recessed on two opposite faces, in the axis of the intake line 6 of the oxidizing gas (not shown in Figure), so as to attain the perpendicularlity of the rows 12 distributing this gas.

The walls thus exposed are pierced with slits, so as to free the channels 7b over the whole of the depth of each row 12 for passage of the oxidizing gas.

The useless channels serving neither for the passage of the oxidizing gas nor for that of the oxidizable charge are closed with a ceramic paste, at the level of the recess.

Figure 2B:
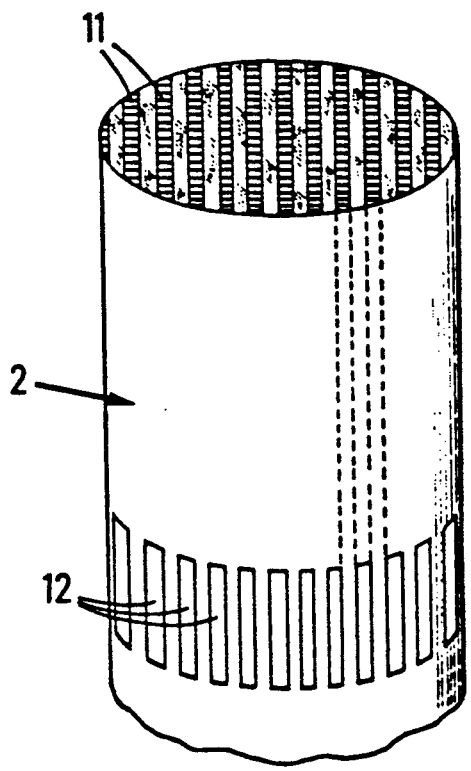
Figure 3E:
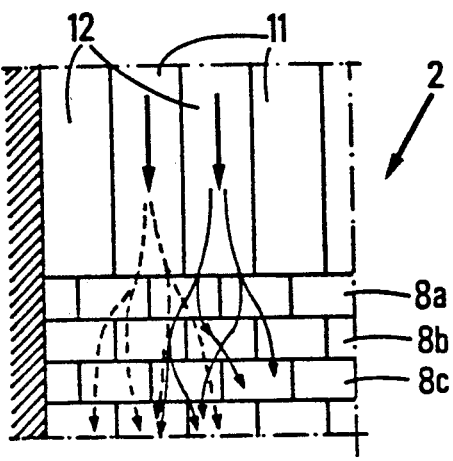
FIGS. 3A, 3B, 3C and 3D show a schematically top view of the disks of the mixing means in three different embodiments.

If the first monolith 2 does not have a square section following, for example, the obstruction of the channels by a ceramic paste adjacent the external wall of the reactor, but on the contrary, in another embodiment, if it occupies the whole surface of the reactor as shown in FIG. 2B, it is possible to recess the wall of the reactor only at the level of the rows 12 intended for distribution of the oxidizing gas and connect these latter to the gas intake line 6.

The width of the slit thus formed will be at most equal to that of each row 12. The width of each row may correspond to the width of 1, 2 or 3 channels depending on the dimension of the mesh of the mixer.

The layers of oxidizing gas and oxidizable charge are formed alternately and are placed in contact in mixer 3.

The oxidization reaction is initiated at this stage, all the more so since the fluids have been preheated. To avoid any runaway of the reaction and consequently any explosion, the section of each unitary channel is not of any value, but is equal to the value between 0.0025 and 100 mm² corresponding to the flame quenching dimension.

Similarly, the section of each mesh or monolith channel 9 at the level of each disk 8 of mixer 3 must be such that it corresponds to a dimension at most equal to the flame quenching spacing or distance. Finally, the distance between the first monolith and the mixer is at most equal to 10 mm, which distance may be found again, for the same reasons, between the mixer 3 and the second monolith 4.

Advantageously, the facing surfaces of the mixing zone and of the distribution zone, on the one hand, and the facing surfaces of the mixing zone and of the reaction zone, on the other, are substantially equal.

These surfaces are those defined by a plane perpendicular to the flow direction or to the channels.

Preferably, they are substantially equal to the cross-section of the reactor through a radial plane, so that the whole surface of the reactor is used to full capacity (FIG. 2B).

FIGS. 3A, 3B, 3C and 3D show different embodiments of mixer 3. This latter in fact includes a plurality of cylindrical disks 8a, 8b, 8c, of a diameter preferably equal to that of the reactor, and of a thickness between 1 and 10 mm. Each disk 8 is provided with a mesh pattern of channels (monolith) of individual section between 0.0025 mm² and 100 mm² and which corresponds to the surface of a square at least of the dimensions of which is equal to the flame quenching distance.

The mesh pattern of each disk is offset in the directions x and y of the plane, preferably by a/2 if a is the side of the square.

The disks are stacked and held in position by a bar, for example, not shown in the Figure, which is housed in a notch 14 provided for this purpose. One thus end up with a progress of the layers of fluids, shown in FIG. 3D, which provides homogeneous mixing thereof while avoiding the risk of runaway and explosion of the oxidization reaction.

Figure 3A:
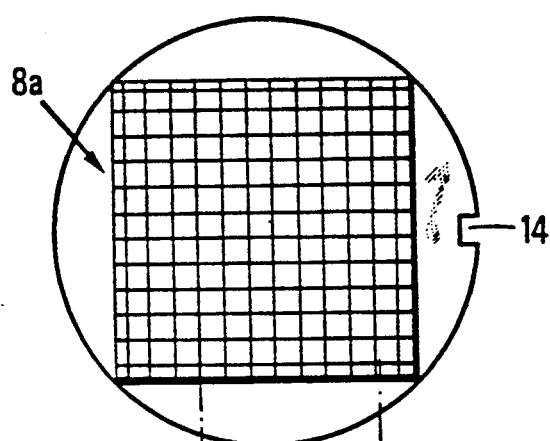
Figure 3C:
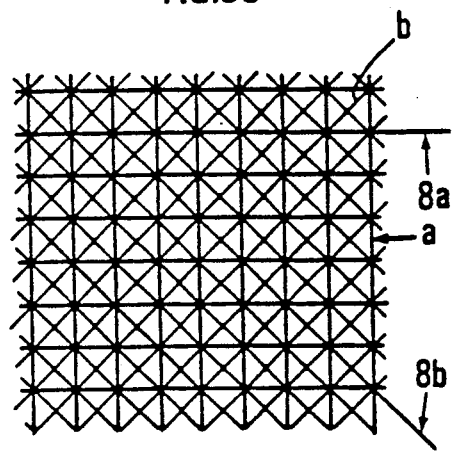
Figure 3B:
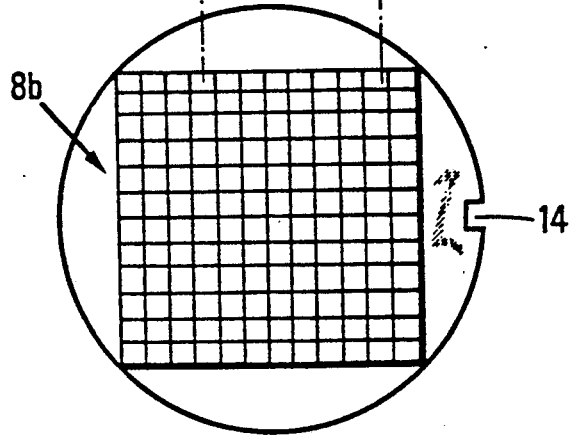
Figure 3D:
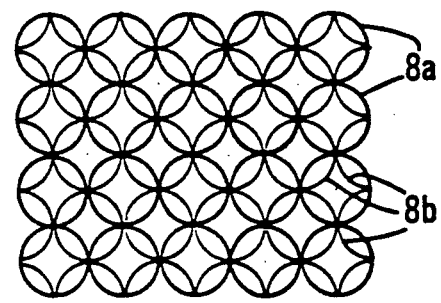

In another embodiment shown in FIG. 3B, the disks 8a, 8b, for example of square section when the monolith 2 has a square section may be disposed alternately so that one of the disks has its mesh or channels oriented along the diagonal of the other and so on.

The stack of disks may advantageously, for example, be formed alternately at 45° with mesh sizes a for one disk and a mesh size $b = a\sqrt{2}/2$ for the other disposed at 45°.

The channels shown in FIG. 3C may also be round and the channels of one disk may be offset for example along a single axis of the plane or along its two axes (FIG. 3C).

FIG. 4 shows another embodiment of the mixing means. It includes a plurality of plates 21 disposed generally in the gas flow direction and advantageously vertically and parallel to the axis of channels 7a.

Each plate, whose dimensions are for example 200×50×3 mm, is recessed on each side with channels 23 of about 1 mm in length and 1 mm in depth.

The projections 22 thus defined have substantially the same dimensions. Ducts 23 are slanted through about 45° with respect to the axis of the reactor and to the flow direction of the fluids on one of its faces and substantially through the same angle, but in the opposite direction on the other face. They may be juxtaposed so that the contacting faces of two adjacent plates have crossed channels, which promotes efficient mixing of the fluids.

In the example shown in FIG. 4, the two plates have however, been moved apart so as to better illustrate the crossing of the channels 23.

At the outlet of the mixer, the gas mixture continues the oxidization reaction in the reaction zone shown by the second monolith 4 described above and which is spaced by at most 10 mm from mixer 3 so as to avoid any risk of runaway of the reaction.

The assembly of units 2, 3, 4 heretofore described are held in postion in a sleeve 15, made for example from mullite, and are introduced into a steel casing 16 covered with refractory concrete 18 in accordance with a well known technique. Refractory fiber seals 17 disposed on each side of the recess isolate the oxidizable charge from the oxidizing gas.

Sealing using seals clamped between the monolith and the metal refractory concrete covered casing is an advantageous technique for it avoids connections between ceramic pipes and metal pipes which, taking into account the thermal stresses during heating or cooling, promote breakage of the ceramic material.

This technique also allows several monoliths to be connected together without having to use a bonding material for these monoliths or a ceramic-ceramic connection using flanges with sealing by clamping the flanges.

When it is a question of pressurized and stoechimetric oxidization reactions which require very small flame quenching distances difficult to obtain from the technological point of view, it is possible, in another embodiment such as shown in FIG. 6, to fill the reactor 1 at least partially, for example the mixing zone and especially the reaction zone 4, with ceramic balls 19 or with any other form of filling including for example ceramic sticks, of dimensions chosen as a function of the quenching distance and which will be retained by a grid 20, or a catalyst.

In another embodiment of the distribution zone illustrated in FIG. 7, the reactor may include at least one row 11 comprising at least one channel 7a and connected to the feed means 5 and all round the row 11 a packing 12a connected to the feed means 6 and including particulate elements of a size between 0.01 and 10 mm providing spaces whose passages have a dimension at most equal to 10 mm.

A grid 20 retains the particulate elements in the reactor. The rows 11 of the channels are filled with particulate elements 25 if the dimensions of the channels are not compatible with the flame quenching distance.

Refractory fiber seals 17 disposed between each row 11 isolates the oxidizable charge from the oxidizing gas and may easily be removed for installing or removing the packings.

With these arrangements and the materials used oxidization reactions can be carried out at very high temperatures of the order 1300° for example, without untimely deposition of carbon and with residence times in the reactor not exceeding for example 1000 ms, while protecting the reactor from the heat released during the reaction.

The following example is given by way of illustration:

EXAMPLE

A vertical tubular shaped reactor 1 is provided including:
   a first monolith 2 made from silicon carbide 170 mm in length, with circular cross-section (diameter=40 mm) and the section of each channel of which is 0.64 mm² (the thickness of a dividing wall is 0.1 mm).

On one of the faces of the monolith representing the upper part, a part of the channels is closed off with a ceramic based so as to obtain a square of 26 mm each side. In this square, two rows of channels out of four are closed off alternately.

Then, from the dimension of 60 mm taken from the mixer 3 the monolith 2 is recessed over 30 mm on two opposite faces in the axis of the pipe through which arrives the oxygen as oxidizing gas. The depth of the recess in the middle thereof is 7 mm, so as to be in line with the above defined square.

In the walls thus exposed slits are formed whose position corresponds to the rows of channels closed off on the upper face of the monolith. Then the oxidizable charge and the oxygen are caused to flow at a pressure of 10 bars.

The channels free at the base of the recess are also closed off so as to prevent the oxygen from penetrating into the reactor through these channels:
   a mixer 3 of the same area as monolith 2 formed of mullite monoliths of the same mesh as above, namely 0.64 mm² in section, 5 mm thick and applied against the first monolith. As described above twenty monoliths are alternated whose center corresponds to the crossing of two channel walls with twenty monoliths whose center corresponds to the center of the channel;

a second mullite monolith 4 in which the section of each channel is 0.64 mm$^2$, whose length is 450 mm and which has the same area as the mixer 3. This monolith is in contact with the mixer.

The assembly of the reactor units or stages 2, 3, 4 is held in position by a mullite sleeve of a length of 635 mm.

Then, into the reactor such as described above and operating at 10 bars, through the upper line 5 an oxidizable charge is introduced including a gas mixture at 400° C. and whose composition is the following:

|  | Moles |
| --- | --- |
| methane | 25.55 |
| hydrogen | 42.74 |
| carbon dioxide | 8.18 |
| carbon monoxide | 6.09 |
| water | 46.76 |

13.20 moles of pure oxygen at 150° C. are injected through the radial tubular channel 6.

At the outlet of the reactor, the temperature is 940° C. The product has the following composition:

|  | Moles |
| --- | --- |
| methane | 4.18 |
| hydrogen | 82.50 |
| carbon dioxide | 10.21 |
| carbon monoxide | 25.38 |
| water | 49.73 |

What is claimed is:

1. A method for oxidizing an oxidizable charge in the gaseous phase by forming a gas mixture containing at least one oxidizing gas, which comprises the following successive steps:

(a) causing the oxidizable charge and the at least one oxidizing gas to flow simultaneously in a distribution zone located at one end of a longitudinal reactor, said distribution zone being made from a ceramic material and having first passages defined by at least one row of channels of a first group and second passages defined by at least one row of channels of a second group so that one of the oxidizable charge and the at least one oxidizing gas, flows separately inside the first passages defined by the at least one row of channels of a first group and so that the other of the oxidizable charge and the at least one oxidizing gas flows separately in the second passages defined by at least one row of channels of a second group, the oxidizable charge and the at least one oxidizing gas flowing in the distribution zone through a plurality of said passages, each having a cross-section defined, at least in one direction, by a dimension at most equal to 10 mm corresponding to the distance for quenching a flame which may result from oxidization of said oxidizable charge by reaction with the at least one oxidizing gas;

(b) then mixing said oxidizable charge and said at least one oxidizing gas distributed in a side-by-side relationship within said distribution zone in a mixing zone made from a ceramic material defining a multiplicity of passages, each having a cross-section defined, in at least one direction, by a dimension comparable to that of the passages within the distribution zone, said multiplicity of passages communicating with each other in a staggered arrangement to insure mixing of gases;

(c) causing a mixture of products resulting from passage of said gases through the mixing zone to enter into and react in a reaction zone made from a ceramic material including another multiplicity of passages each having a cross-section defined, in at least one direction, by a dimension comparable to that of the passages in the distribution zone and in the mixing zone, the distance between the distribution zone and the mixing zone, as well as the distance between the mixing zone and the reaction zone being at most equal to the distance of at most 10 mm for flame quenching; and (d) discharging reaction products from said reaction zone at the other end of said longitudinal reactor.

2. The method as claimed in claim 1, wherein said other gas of the two gases is caused to flow within a row of said channels of the second group which contains a packing material made up of particulate elements.

3. The method as claimed in claim 2, wherein said particulate elements include spheres and rods of ceramic material.

4. The method as defined in claim 2, wherein the at least one row of channels of the first group is arranged to extend along an axis parallel to a longitudinal axis of the reactor and the oxidizable charge is introduced into the at least one row of channels of the first group so that the oxidizable charge is distributed in the distribution zone in a direction substantially perpendicular to the axis of each of the channels of the first group at an intermediate location situated at a distance from the mixing zone between 40 and 95% of the total length of the distribution zone and the at least one oxidizing gas is introduced into said at least one row of channels of the second group so that the at least one oxidizing gas is distributed in the distribution zone along the axis of said at least one row of channels of the first group.

5. The method as claimed in claim 2, wherein the at least one row of channels of the first group is arranged to extend along an axis parallel to a longitudinal axis of the reactor and the oxidizable charge is introduced into the at least one row of channels of the first group so that the oxidizable charge is distributed in the distribution zone along an axis of said at least one row of channels of the first group and the at least one oxidizing gas is introduced into said distribution zone into the at least one row of channels of the second group in a direction substantially perpendicular to the axis of the channels of the first group at an intermediate location situated at a distance from said mixing zone between 40 and 95% of the total length of the distribution zone.

6. The method as claimed in claim 1, wherein said oxidizing gas is oxygen.

7. An oxidation reactor for oxidizing an oxidizable charge gas which comprises an oxidizing gas feed means, an oxidizable charge gas feed means and discharge means for discharging reaction products resulting from the reaction of the oxidizing gas and the oxidizable charge gas from the reactor, said reactor further including a longitudinal housing and in one end portion of the housing a gas distribution means comprising a monolithic structure made from a ceramic material having at least one row of channels of a first group connected to one of the gas feed means and inside which a gas flows, said distribution means also including outside of said channels a plurality of channels of a second group connected to feed means of said other of the gas feed means, the inside of said channels of the first group further being filled with a packing material to define a plurality of spaces having cross-sections, defined in at least one direction, by a dimension at most equal to 10 mm, said at least one row of channels of a first group and said plurality of channels of the second group being arranged for distributing separate streams of the oxidizing charge gas and the oxidizing gas into a gas mixing means made from a ceramic material and located adjacent to and in fluid communication with said distribution means within said reactor; said mixing means mixing said streams of oxidizable charge gas and said oxidizing gas as the oxidizable charge gas and the oxidizing gas flow along a length of the mixing means and defining along the length of said mixing means a multiplicity of spaces having cross-sections defined, in one direction at least, by a dimension at most equal to 10 mm, said mixing means being situated at a distance at most equal to 10 mm from ends of said channels in the distribution means and from a gas reaction means located adjacent to and in fluid communication with the mixing means, said reaction means comprising another monolithic structure made from a ceramic material for defining another multiplicity of spaces each having a cross-section defined, in one direction, at least by a dimension at most equal to 10 mm through which reaction products obtained from the reaction of said oxidizable charge gas and said oxidizing gas are channeled to the discharge means located at the other end portion of said reactor.

8. The reactor as claimed in claim 7, wherein said mixing means includes a plurality of separate elements each provided with mesh-like openings that are offset substantially with respect to each other for defining said multiplicity of spaces through which the oxidizable charge gas and the oxidizing gas pass.

9. The reactor as claimed in claim 7, wherein said mixing means includes a plurality of substantially vertical plates with, on each side thereof, a plurality of projections and grooves slanting in opposite direction on each side of each plate, said plates being disposed so that the projections and the grooves are crossed by gases passing therethrough.

10. The reactor as claimed in claim 7, wherein said mixing means has in a cross-section made along a plane and arranged perpendicular to a flow direction of gases within said channels, an area at least equal to that of the distribution means and at most equal to that of the reaction means.

11. The reactor as claimed in claim 7, wherein said mixing means has in cross-section made by a plane arranged perpendicular to a flow direction of gases in said channels, an area substantially equal with respect to that of the distribution means and with respect to that of the reaction means.

12. The reactor as claimed in claim 7, wherein said oxidizable charge gas feed means is connected to discharge in the channels of the first group at an intermediate location situated on at least one of the sides of the reactor at a distance from said mixing means between 40 and 95% of the total length of the distribution means and said oxidizing gas feed means are connected to the one end portion of the reactor.

13. The reactor as defined in claim 7, wherein said oxidizable charge gas means are connected to channels of the first group at the one end portion of the reactor and said oxidizing gas feed means are connected to channels of the second group at an intermediate location situated on a side of the reactor at a distance from said mixing means between 40 and 95% of the total length of the distribution means.

14. The reactor as defined in claim 7, wherein the channels of the first group and the channels of the second group comprise at least one monolith provided with a plurality of juxtaposed channels.

15. The reactor as defined in claim 7, wherein said channels of the first group and the channels of the second group contain particulate elements including ceramic spheres and rods.

16. The reactor as defined by claim 7, wherein the channels include a catalyst material.

17. The reactor as claimed in claim 7, wherein a portion of the channels of the first group and a portion of the channels of the second group are closed off at ends of the channels so that the channels of the first group and the channels of the second group are arranged in a side-by-side alternate arrangement within a single monolith structure.

* * * * *